Jan. 13, 1925.  1,522,586
C. H. HAASE
STEP PLATE FOR AUTOMOBILES
Filed Feb. 12, 1924  2 Sheets-Sheet 1

Conrad H. Haase
INVENTOR
BY Victor J. Evans
ATTORNEY

WITNESSES:
R. E. Wise.

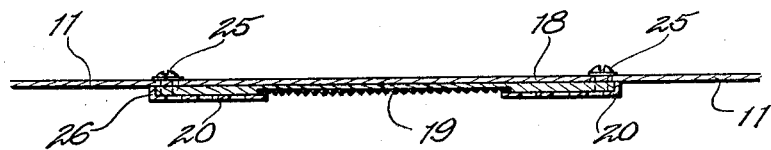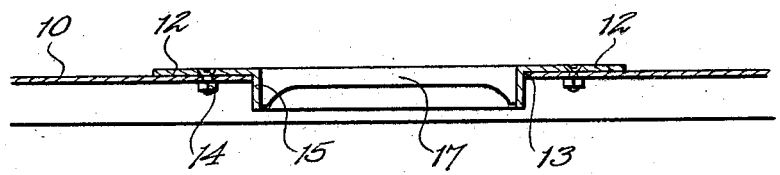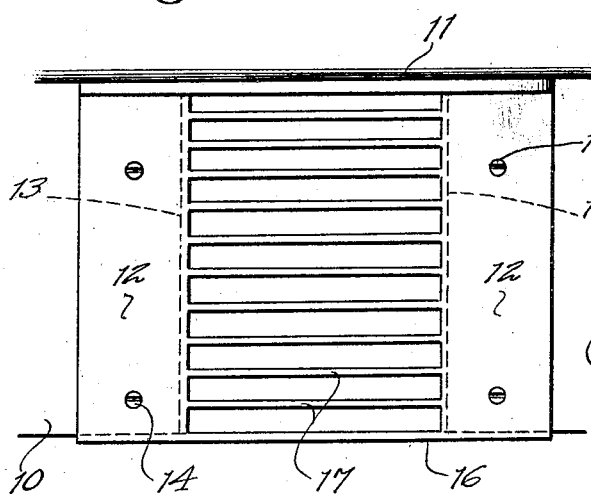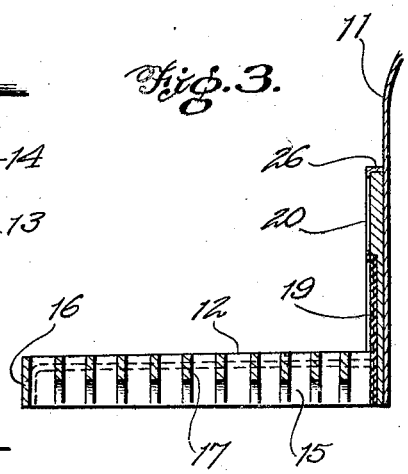

Patented Jan. 13, 1925.

1,522,586

UNITED STATES PATENT OFFICE.

CONRAD H. HAASE, OF MIAMI, FLORIDA.

STEP PLATE FOR AUTOMOBILES.

Application filed February 12, 1924. Serial No. 692,395.

*To all whom it may concern:*

Be it known that I, CONRAD H. HAASE, a citizen of Russia, residing at Miami, in the county of Dade and State of Florida, have invented new and useful Improvements in Step Plates for Automobiles, of which the following is a specification.

This invention relates to improvements in step plates for automobiles and has for an object the provision of a plate of novel construction, whereby mud or dirt may be removed from a person's shoes before entering the automobile and the mud or dirt disposed of in a manner to prevent its collection upon the running board.

Another object of the invention is the provision of novel means for securing a plate of this character in place.

Another object of the invention is the provision of a step plate which also includes a scuff plate, which latter may be carried by or may be separate from the step plate, the said scuff plate carrying a cleaning element and having novel means for removably securing the cleaning element in place.

With the above and other objects in view, the invention further includes the following novel features and details of construction, to be hereinafter more fully described, illustrated in the accompanying drawings and pointed out in the appended claim.

In the drawings:—

Figure 2 is a plan view of the same.

Figure 3 is a vertical transverse section.

Figure 4 is a horizontal section.

Figure 5 is a vertical longitudinal section.

Figure 1:
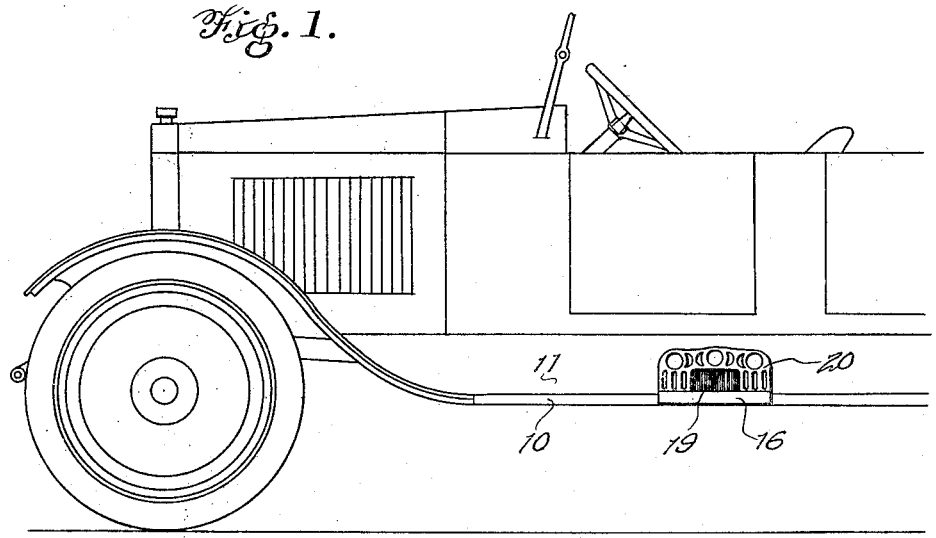
Figure 1 is a fragmentary elevation of a portion of an automobile with the invention applied.
Figure 6:
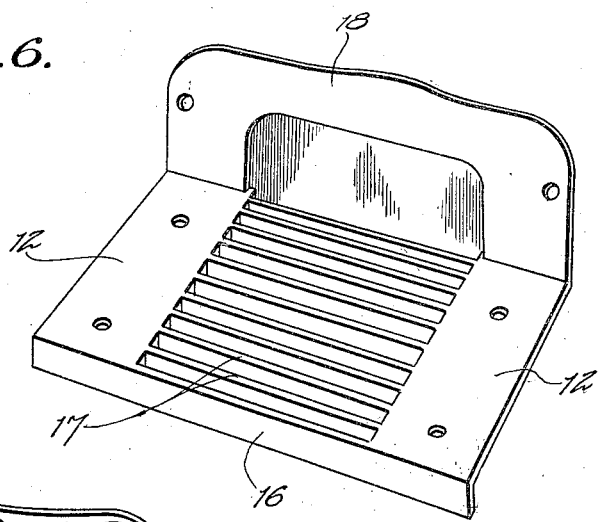
Figure 6 is a perspective view of the step plate with the clamping plate removed.
Figure 7:
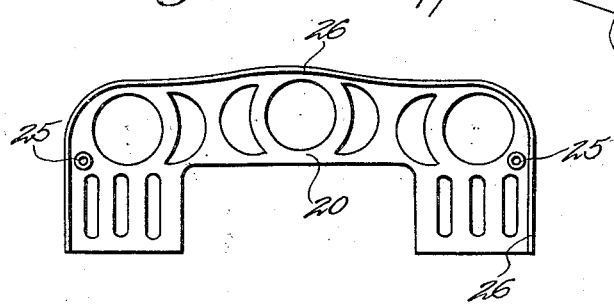
Figure 7 is a detail perspective view of the clamping plate.

Referring to the drawings in detail wherein like characters of reference denote corresponding parts, the reference character 10 indicates a portion of the running board of an automobile and 11 the mud and dust shield rising from the inner edge thereof.

The step plate which constitutes the present invention comprises spaced transversely disposed flanges 12 which are secured to the running board 10 upon opposite sides of an opening 13 provided in the said board. Any suitable means may be employed for securing the flanges 12 in place, such as securing devices 14. These flanges 12 have extending downwardly along their opposed edges ribs 15 and these ribs together with the flanges 12 engage the walls of the opening 13 and the top of the board 10, while a flange 16 extends along the outer edge of the step plate over the running board. The flanges 10 and ribs 15 are connected by spaced parallel bars 17, the latter being of sufficient thickness to insure proper strength and extending over the opening 13, the said bars being substantially arch shaped. These bars provide means whereby mud or dirt may be scraped from a person's shoes and the mud or dirt so removed will pass through the openings between the bar 17 so as not to collect and present an unsightly appearance upon the running board.

Extending upwardly from the inner edge of the said plate is a scuff or toe plate 18 which is adapted to be positioned in front of the mud or dust apron 11 so as to prevent the latter from being scarred by the shoe of a person entering the automobile. This scuff plate carries a cleaning element which may be of any suitable character such as a brush or other wiping element, a section of rubber mat 19 being illustrated. This mat 19 is corrugated and is removably held in place by means of a clamping plate 20 which engages over the edges of the mat and which is secured in place by suitable clamping devices 25. The clamping plate 24 is provided around its upper and side edges with a flange 26 which engages over the upper and side edges of the scuff plate. The scuff plate may be provided with suitable ornamentation and the clamping plate may have openings therein as shown, through which the ornamentation of the scuff plate may be seen.

The invention is susceptible of various changes in its form, proportions and minor details of construction and the right is herein reserved to make such changes as properly fall within the scope of the appended claim.

Having described the invention what is claimed is:—

A step plate comprising a tread portion having openings therein, attaching flanges at each end of the plate, a vertically disposed scuff plate extending upward from one edge of the tread portion, a cleaning element carried by the scuff plate, a clamping plate for holding the cleaning element in position, a right angularly disposed flange extending around the upper and side edges of the clamping plate and engaging over the upper and side edges of the cleaning element and scuff plate and means for removably securing the clamping plate to the scuff plate.

In testimony whereof I affix my signature.

CONRAD H. HAASE.